(12) United States Patent
Martins

(10) Patent No.: US 10,119,773 B2
(45) Date of Patent: Nov. 6, 2018

(54) STACKED PLATE HEAT EXCHANGER HOUSING AND EXCHANGER COMPRISING SUCH A HOUSING

(75) Inventor: Carlos Martins, Le Chesnay (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 179 days.

(21) Appl. No.: 14/129,604

(22) PCT Filed: Jun. 28, 2012

(86) PCT No.: PCT/EP2012/062590
§ 371 (c)(1),
(2), (4) Date: Mar. 10, 2014

(87) PCT Pub. No.: WO2013/001017
PCT Pub. Date: Jan. 3, 2013

(65) Prior Publication Data
US 2014/0231054 A1 Aug. 21, 2014

(30) Foreign Application Priority Data

Jun. 30, 2011 (FR) ...................................... 11 02056

(51) Int. Cl.
*F28F 9/00* (2006.01)
*F02B 29/04* (2006.01)
(Continued)

(52) U.S. Cl.
CPC .......... *F28F 9/001* (2013.01); *F02B 29/0462* (2013.01); *F28D 9/0043* (2013.01);
(Continued)

(58) Field of Classification Search
CPC ........ F28F 9/001; F28F 3/08; F28F 2275/045; F02B 29/0462; F28D 9/0043; F28D 2021/0082; Y02T 10/146
(Continued)

(56) References Cited

U.S. PATENT DOCUMENTS 5,228,515 A * 7/1993 Tran ...................... F28D 9/0037
165/166
7,610,949 B2 * 11/2009 Palanchon ......... F02M 25/0728
165/103

(Continued)

FOREIGN PATENT DOCUMENTS

EP 1 930 681 A1 6/2008
EP 1 983 171 A1 10/2008
(Continued)

OTHER PUBLICATIONS

International Search Report for Application No. PCT/EP2012/062590 dated Aug. 8, 2012, 7 pages.
(Continued)

*Primary Examiner* — Raheena R Malik
(74) *Attorney, Agent, or Firm* — Howard & Howard Attorneys PLLC

(57) ABSTRACT

A housing of a stacked-plate heat exchanger is disclosed, the housing defining a volume for accepting a plurality of stacked plates that are configured for the circulation of a fluid that is to be cooled and of a coolant. The housing defines an interface able to accept a header tank for the fluid that is to be cooled and comprising a first part able to move in the direction in which the plates are stacked when the stacked plates are being brazed, and a second part that has at least one flank defining the interface, the first and second parts being able to be assembled with one another when the plates are being brazed. A heat exchanger comprising the housing is also disclosed.

13 Claims, 3 Drawing Sheets

(51) Int. Cl.
  *F28D 9/00* (2006.01)
  *F28F 3/08* (2006.01)
  *F28D 21/00* (2006.01)
(52) U.S. Cl.
  CPC ........ *F28F 3/08* (2013.01); *F28D 2021/0082* (2013.01); *F28F 2275/045* (2013.01); *Y02T 10/146* (2013.01)
(58) Field of Classification Search
  USPC .................................................. 165/164, 166
  See application file for complete search history.

(56) References Cited

U.S. PATENT DOCUMENTS

| | | | | |
|---|---|---|---|---|
| 7,681,629 | B2* | 3/2010 | Yamaguchi | F01N 5/02 165/166 |
| 7,854,255 | B2* | 12/2010 | Nakamura | F02M 25/0737 165/149 |
| 8,651,170 | B2* | 2/2014 | Maeda | F02M 25/0737 165/152 |
| 8,925,624 | B2* | 1/2015 | Kuroyanagi | F02M 25/0737 165/157 |
| 2002/0104645 | A1* | 8/2002 | Yoshida | F28D 9/0043 165/166 |
| 2006/0219394 | A1* | 10/2006 | Martin | F28D 9/0043 165/157 |
| 2007/0193732 | A1* | 8/2007 | Oofune | F02M 25/0728 165/164 |
| 2007/0221181 | A1* | 9/2007 | Maucher | F01N 3/04 123/568.12 |
| 2008/0053644 | A1* | 3/2008 | Beetz | F02B 29/0462 165/151 |
| 2008/0110595 | A1* | 5/2008 | Palanchon | F02M 25/0728 165/103 |
| 2008/0156472 | A1 | 7/2008 | Maucher et al. | |
| 2008/0169093 | A1* | 7/2008 | Ohfune | F02M 25/0714 165/164 |
| 2008/0202735 | A1* | 8/2008 | Geskes | F28D 9/0006 165/166 |
| 2008/0271722 | A1* | 11/2008 | Grunenwald | F28D 9/0043 123/568.12 |
| 2009/0014153 | A1* | 1/2009 | Pimentel | F02B 29/0462 165/67 |
| 2010/0044019 | A1* | 2/2010 | Maeda | F02M 25/0737 165/151 |
| 2010/0089548 | A1* | 4/2010 | Braic | F28D 7/1692 165/51 |
| 2011/0168366 | A1 | 7/2011 | Garret et al. | |
| 2012/0247145 | A1* | 10/2012 | Denoual | F28D 9/0006 62/498 |
| 2012/0292002 | A1* | 11/2012 | Saumweber | F02B 29/0462 165/164 |
| 2013/0133869 | A1* | 5/2013 | Kinder | F28F 9/02 165/173 |
| 2014/0109857 | A1* | 4/2014 | Vallee | F02B 29/0462 123/184.21 |

FOREIGN PATENT DOCUMENTS

| | | |
|---|---|---|
| FR | 2 855 605 A1 | 12/2004 |
| FR | 2 906 017 A1 | 3/2008 |
| WO | WO 2009/156365 A1 | 12/2009 |

OTHER PUBLICATIONS

English language abstract for EP 1 930 681 extracted from espacenet.com database on May 21, 2014, 31 pages.
English language abstract and machine-assisted English translation for EP 1 983 171 extracted from espacenet.com database on May 21, 2014, 35 pages.
English language abstract and machine-assisted English translation for Fr 2 855 605 extracted from espacenet.com database on May 21, 2014, 11 pages.
Machine-assisted English language abstract and machine-assisted English translation for FR 2 906 017 extracted from espacenet.com database on May 21, 2014, 38 pages.
English language abstract for WO 2009/156365 extracted from espacenet.com database on May 21, 2014, 27 pages.

* cited by examiner

STACKED PLATE HEAT EXCHANGER HOUSING AND EXCHANGER COMPRISING SUCH A HOUSING

RELATED APPLICATIONS

This application is the National Stage of International Patent Application No. PCT/EP2012/062590, filed on Jun. 28, 2012 which claims priority to and all the advantages of French Patent Application No. FR 11/02056, filed on Jun. 30, 2011, the content of which is incorporated herein by reference.

The present invention relates to a stacked-plate heat exchanger housing and to an exchanger comprising such a housing.

The invention applies to any type of heat exchanger, notably for a motor vehicle, such as heat exchangers for example intended to be mounted in the engine compartment of the vehicle, such as charge air coolers (CAC).

Heat exchangers comprising a series of stacked plates forming heat exchange surfaces between which a fluid that is to be cooled and a coolant circulate, in alternating layers, through fluid passage circuits, are known in this field.

When the exchanger is being assembled it is known practice to position the stack of plates on a bottom of the housing and to position a cover over the stack of plates before brazing the assembly together in a brazing furnace. In order to allow the plates to be secured, they are coated with a coating of braze material. During the brazing operation this coating melts, thus reducing the height of the stack of plates. This reduction in height is referred to as the compaction of the plates. The cover thus needs to move towards the bottom in the direction in which the plates are stacked and the height between the bottom of the housing and the cover of the housing is destined to decrease.

Moreover, to collect the fluid that is to be cooled, it is known practice to use an inlet header tank and/or an outlet header tank. These header tanks are fixed to the sides of the housing, particularly to part of the bottom and to part of the cover of the housing.

One difficulty encountered in attaching the header tanks stems from the fact that the relative position of the cover with respect to the bottom is dependent on the brazing and on the compaction of the stacked plates. It is therefore difficult to have precise control over the interface between the header tanks and the housing because that is dependent on the relative positioning of the cover and of the bottom of the housing. That presents problems notably when assembling the exchanger, which problem may go so far as to lead to imperfect sealing.

It is an object of the invention to overcome the above-mentioned problems.

The invention for that proposes a housing of a stacked-plate heat exchanger, the said housing defining a volume intended to accept a plurality of stacked plates which plurality is configured for the circulation of a fluid that is to be cooled and of a coolant, the said housing defining an interface able to accept a header tank for the fluid that is to be cooled and comprising a first part able to move in the direction in which the plates are stacked when the stacked plates are being brazed, and a second part that has at least one flank defining the said interface, the said first and second parts being able to be assembled with one another when the plates are being brazed.

Thus, by virtue of the invention, the interface intended to accept the header tank is defined by a part of the housing that is insensitive to the compaction. It is therefore no longer dependent on the brazing operation and on the thicknesses of coating used. Thus it is possible to predict exactly the position of the interface on the housing whatever the compaction that takes place during the brazing operation and the repeatability of the positioning of the header tank or tanks on the housing can thus be improved. This then provides a continuous interface.

According to one aspect of the invention, the said second part has two said turned-up flanks, referred to as the first and second turned-up flanks, the interface defined by the first flank, known as the first interface, being able to accept an inlet header tank for the fluid that is to be cooled and the interface defined by the second flank, known as the second interface, being able to accept an outlet header tank for the fluid that is to be cooled.

According to another aspect of the invention, the second part comprises a bottom intended to lie facing an end plate of the plurality of stacked plates, the bottom and the flank or flanks forming a unit assembly.

According to one embodiment, the said interface defines a surround in the middle of which there is an opening allowing the fluid that is to be cooled to enter and/or leave the housing. In this way, the opening in the middle of the surround of the first interface allows the fluid to enter the housing and the opening in the middle of the surround of the second interface allows the fluid to leave the housing.

According to another embodiment, the surround is bordered by a collar diverging towards the inside of the housing, delimiting the opening and able to collaborate with the header tank for the fluid that is to be cooled. The collar projects with respect to the interface and is intended to penetrate into the header tank.

According to one aspect of the invention, a portion of the collar is in contact with a lateral end of the bottom of the second part. In this way, the opening is able to allow the fluid that is to be cooled to pass between all the plates of the stack, including between the end plate situated against the bottom of the housing and a plate adjacent to this plate.

According to another aspect of the invention, the first part comprises two lateral walls and a top wall. The two lateral walls and the top wall form, for example, a unit assembly notably obtained by bending and/or pressing a metal sheet. The internal volume is thus delimited by the bottom and the flank or flanks of the second part, and the lateral walls and top wall of the first part.

According to one embodiment, the lateral wall or walls and/or the top wall each have a turned-up edge, at least partially in contact with one face of the flank which face faces towards the inside of the volume and is known as the internal face. During the brazing operation, the turned-up edge or edges, secured to the first part, can thus move in the direction of stacking of the plates, against the internal face of the flank and become secured thereto at the end of brazing.

According to another embodiment, the turned-up edge of the top wall joins together the turned-up edges of the two lateral walls. The first part of the housing thus comprises a continuous turned-up edge at least partially in contact with the internal face of the first flank and/or the internal face of the second flank.

According to one aspect of the invention, the bottom of the second part comprises a central part and two longitudinal ends each one defining a shoulder with respect to the central part, each shoulder allowing a distal end of the lateral walls of the first part to lie in a plane running externally to the internal volume defined by the housing. The distal ends of the lateral walls are, for example, likewise provided with the said turned-up edge.

The invention also relates to a heat exchanger comprising a housing as described hereinabove and a plurality of stacked plates which plurality is configured for the circulation of a fluid that is to be cooled and of a coolant, and is situated inside the said housing.

According to one aspect of the invention, each plate has a heat exchange zone intended to encourage the exchange of heat between the fluid that is to be cooled and the coolant, and a bypass zone able to allow the fluid that is to be cooled to bypass the heat exchange zone, part of the said turned-up flank or flanks forming one or more baffles that force the fluid that is to be cooled to circulate through the exchange zone.

The attached figures will make it easy to understand how the invention may be embodied. In these figures identical references denote elements that are similar.

Figure 1:
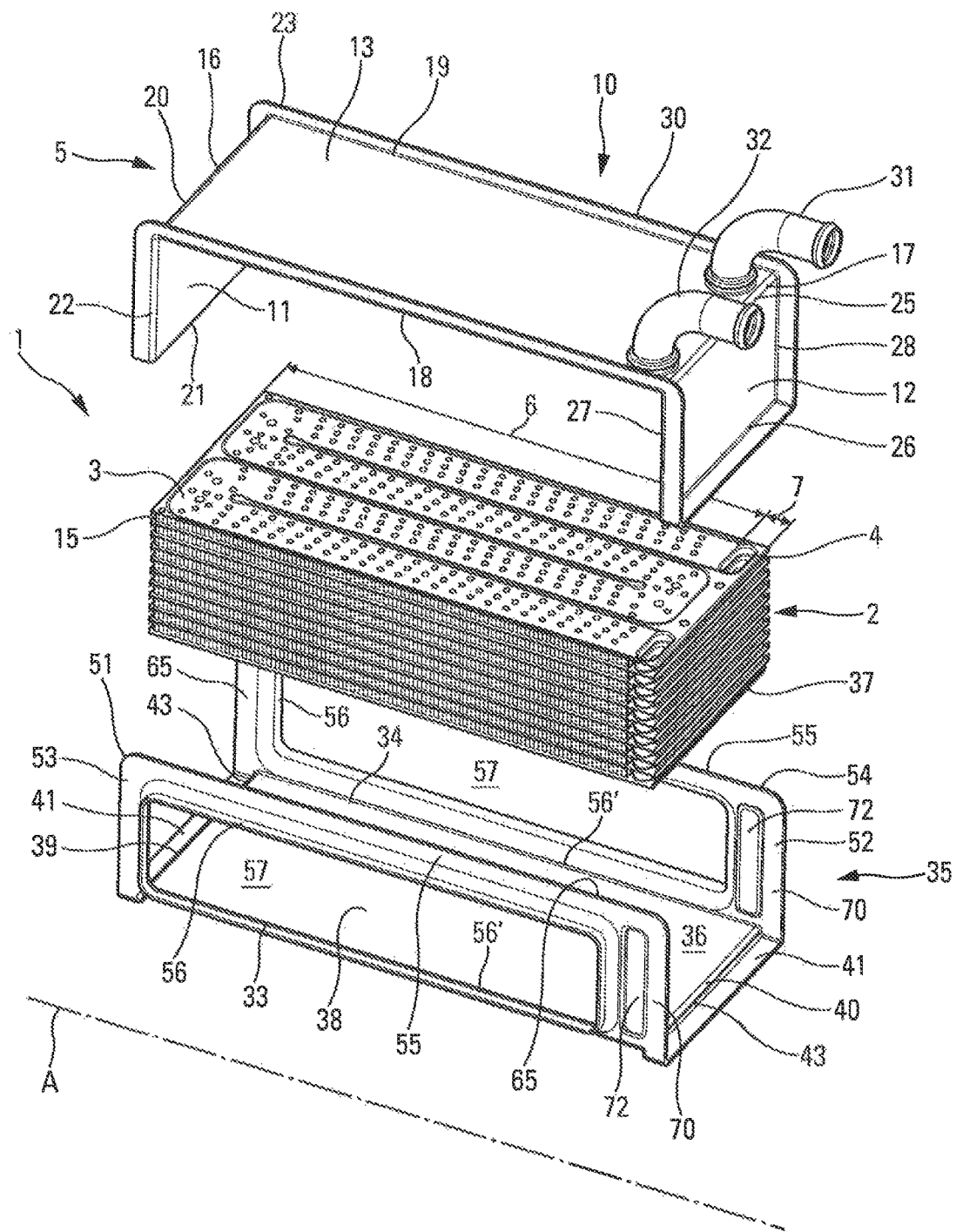
FIG. 1 is an exploded perspective view of a stacked plate heat exchanger provided with a housing according to the invention and with a plurality of stacked plates which is situated inside the housing.
Figure 2:
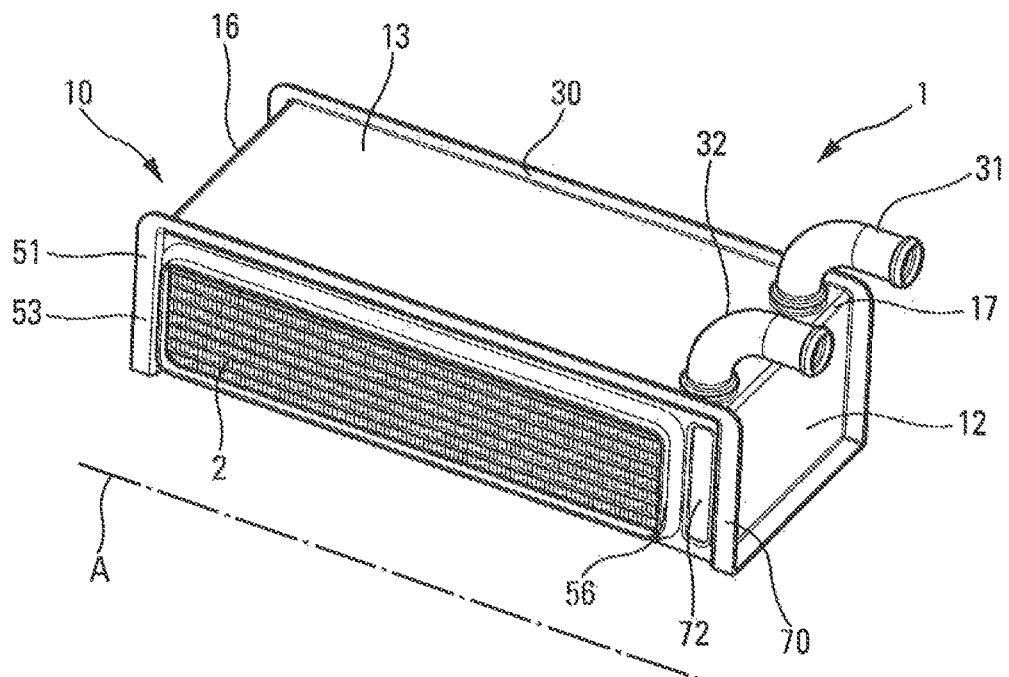
FIG. 2 is a perspective view of the exchanger of FIG. 1, assembled.

The invention can be applied to a heat exchanger 1 as depicted in FIGS. 1 and 2. This exchanger 1 is, for example, a charge air cooler (CAC) of a system supplying intake gases to a motor vehicle combustion engine or the like. In this kind of heat exchanger, the fluid that is to be cooled is, for example, air, compressed by a turbocharger and intended to be supplied to the vehicle engine, and the coolant is notably a heat transfer liquid.

The exchanger 1 comprises a plurality of stacked plates 2 between which the fluid that is to be cooled and the coolant circulate in two independent circuits defined by the said plates 2, in alternating layers. Each plate 2 is, for example, of substantially rectangular shape.

Each plate 2 here comprises a canal 3, for example obtained by pressing, defining a circuit for the coolant. The plates 2 are arranged top to tail, i.e. about a plane of symmetry parallel to the planes in which the plates 2 extend. Two adjacent plates the canals 3 of which face one another in such a way as to define the coolant circulation circuit are referred to as pair of plates 2. The fluid that is to be cooled circulates, by contrast, between two successive pairs of plates, i.e. between two adjacent plates 2 that belong to two successive pairs of plates. Spacers 15 may possibly be provided between each pair of plates 2 on the circuit for the passage of the fluid that is to be cooled in order to improve the exchange of heat between the two fluids.

To allow the coolant to pass from one pair of plates 2 to another, adjacent, pair of plates 2, at one longitudinal end of each plate 2 there are a first and a second open pressings 4. The open pressings 4 of two adjacent plates 2 belonging to different pairs of plates 2 create a canal that allows the fluid to pass from one pair of plates to the other, in a sealed manner. The first of the two open pressings of each plate allow the coolant to enter each pair of plates 2 while the second of the two open pressings 4 of each plate allow the fluid to leave each pair of plates 2 having passed through the circuit defined by the canal 3.

Two zones can thus be delimited in the plurality of stacked plates 2. A first zone, known as the heat exchange zone 6, is intended to encourage the exchange of heat between the fluids and corresponds to the zone in which the coolant circulates inside each pair of plates 2. A second zone, known as the bypass zone 7, is able to allow the fluid that is to be cooled to bypass the heat exchange zone and corresponds to the zone in which the coolant passes from one pair of plates to the other, i.e. the zone in the plates where the open pressings 4 are situated.

In the remainder of the description, the references front, rear, top, bottom, right and left are defined with reference to the direction in which the fluid that is to be cooled circulates through the exchanger.

As depicted in FIGS. 1 and 2, the exchanger 1 comprises a housing 10 according to the invention and delimiting a volume in which the plurality of plates 2 is situated. Such a housing 10 is notably of substantially parallelepipedal shape.

This housing 10 comprises a first part 5 that has a first lateral wall 11, situated on a left-hand side of the exchanger and extending in a plane perpendicular to a longitudinal axis A of extension of the housing, a second lateral wall 12, situated on a right-hand side of the exchanger and extending in a plane perpendicular to the axis A, and a top wall 13, connecting the two lateral walls 11, 12 and extending in a plane perpendicular to the planes in which the lateral walls 11, 12 extend. The lateral walls 11, 12 and the top wall 13 are flat, substantially rectangular and form a unit assembly.

The top wall 13 comprises a first longitudinal end 16 from where the first lateral wall 11 starts and a second longitudinal end 17 from where the second lateral wall 12 starts. It also comprises a first lateral end 18 situated towards the front of the housing 10 and a second lateral end 19 towards the rear of the housing 10.

The first lateral wall 11 comprises a top end 20 in contact with the first longitudinal end 16 of the top wall 13, a distal end 21, a first lateral end 22 situated towards the front of the housing 10 and a second lateral end 23 situated towards the rear of the housing 10. The two lateral ends 22, 23 connect the upper end 20 to the distal end 21.

Similarly, the second lateral wall 12 comprises a top end 25 in contact with the second longitudinal end 17 of the top wall 13, a distal end 26, a first lateral end 27 situated towards the front of the housing 10 and a second lateral end 28 situated towards the rear of the housing 10. The two lateral ends 27, 28 connect the top end 25 to the distal end 26.

The first lateral wall 11 is provided with a turned-up edge 30. It extends in planes perpendicular to the edge corner 16, 20 that connects the first lateral wall 11 and the top wall 13. The turned-up edge 30 starts at the lateral 22, 23 and distal 21 ends of the first lateral wall 11.

The turned-up edge 30 continues along the top wall 13 at the lateral ends 18, 19 of the top wall 13. It extends in the same planes as those defined in the previous paragraph.

The turned-up edge 30 also extends along the second lateral wall 12 at the lateral 27, 28 and distal 26 ends thereof and extends again in the same planes as before.

The turned-up edge 30 is thus continuous along the first and second lateral ends of the lateral and top walls. It may also carry on continuously along the distal ends of the lateral walls. At the distal ends of the lateral walls, the turned-up edge 30 notably extends in a plane parallel to the plane in which the top wall 13 extends.

A coolant inlet nozzle 31 and a coolant outlet nozzle 32 are attached to the top wall 13, notably in a zone close to the second longitudinal end 17 of the top wall 13. These nozzles allow the coolant to enter and leave the exchanger 1.

The housing 10 also comprises a second part 35 which with the first part 5 defines the internal volume in which the plurality of stacked plates 2 is situated.

This second part 35 comprises a bottom 36, for example rectangular, having a flat central part 38 intended to be in contact with an end plate 37 of the plurality of stacked plates 2. The central part 38 of the bottom 36 has a first longitudinal end 39 situated on the left side of the housing 10 and a second longitudinal end 40 situated on the right side of the housing 10. The bottom 36 comprises a first lateral end 33 situated towards the front of the housing 10 and a second lateral end 34 situated towards the rear of the housing 10.

At the first longitudinal end 39 there is a shoulder 41. This shoulder 41 defines an abutment zone extending in a plane parallel to the plane in which the central part 38 extends and is connected to the latter part by a skirt 43 extending in a plane perpendicular to the planes in which the central part 38 and the shoulder 41 extend. The shoulder 41 thus faces the distal end 21 of the first lateral wall 11. The shoulder 41 complements that part of the turned-up edge 30 that is situated at the distal end 21 of the first lateral wall 11. This shoulder 41 is situated in a plane external to the internal volume so that the distal end 21 of the first lateral wall 21 is situated below the bottom 36 once in contact with the said abutment zone.

The same goes for the second longitudinal end 40.

Figure 3:
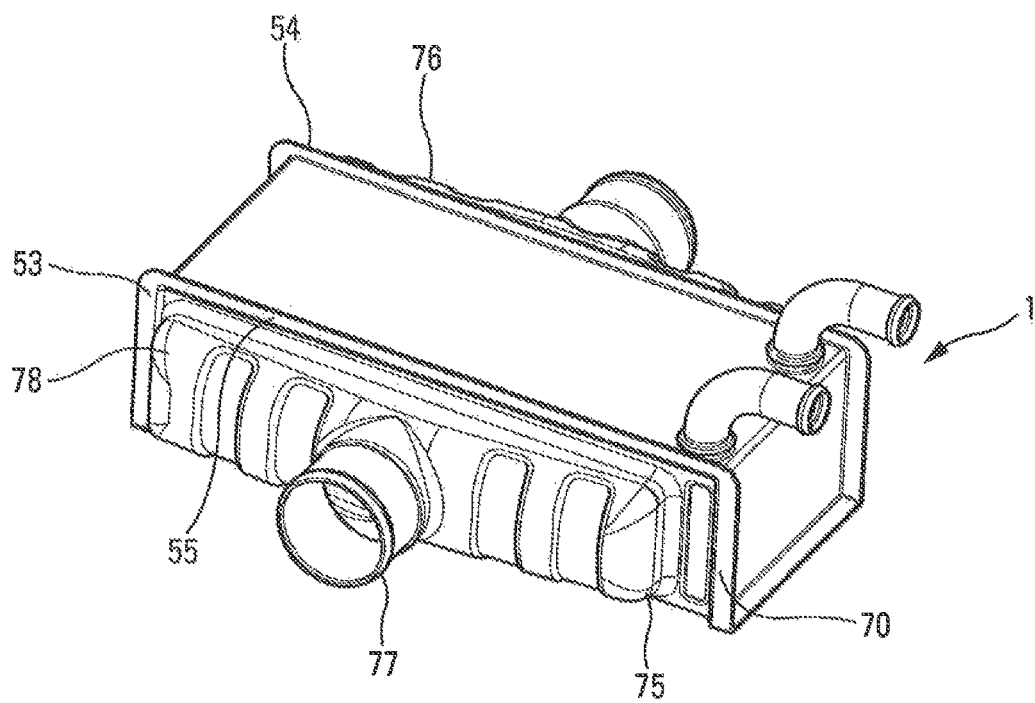
FIG. 3 is a view similar to FIG. 2 depicting the exchanger and the housing fitted with header tanks.

The second part 35 of the housing 10 also comprises at least one flank 51, 52 defining an interface 53, 54 able to accept a header tank for the fluid that is to be cooled (depicted in FIG. 3). In the example illustrated in FIGS. 1 and 2, the second part 35 comprises two flanks, a first flank 51 situated towards the front of the housing 10 and a second flank 52 situated towards the rear of the housing 10. The first flank 51 defines a first interface 53 able to accept an inlet header tank (referenced 75 in FIG. 3) that allows the fluid that is to be cooled to enter the internal volume and the second flank 52 defines a second interface 54 able to accept an outlet header tank (referenced 76 in FIG. 3) that allows the fluid to leave the internal volume. In this particular example, the bottom 36 and the flank or flanks 51, 52 form a unit assembly, for example obtained by pressing and/or bending a metal sheet.

The first flank 51 starts out at the first lateral end 33 of the bottom 36 and extends in a plane perpendicular to the plane in which the central part 38 extends.

The first interface 53 comprises a substantially rectangular surround 55 at the internal periphery of which there is a collar 56 that projects with respect to the surround and is situated on the outside of the internal volume. The collar 56 is of a shape that is divergent towards the internal volume. It delimits an opening 57 via which the fluid that is to be cooled can enter the internal volume and, in particular, can enter the circuit for the circulation of the fluid that is to be cooled, which circuit is defined by the plurality of stacked plates 2.

The collar 56 and the surround 55 are able to collaborate with the inlet header tank for the fluid that is to be cooled. In particular, the surround 55 is intended to be in contact with the inlet header tank while the collar 56 is intend to penetrate inside the inlet header tank.

The collar 56 follows a substantially rectangular outline. It is of rounded cross section and a portion 56' of the collar 56 is tangential to the bottom 36. In particular, the portion 56' of the collar 56 is in contact with the first lateral end 33 of the bottom 36 of the second part 35.

The first flank 51 has an internal face 65, opposite the first interface 53 and directed towards the inside of the internal volume. The said internal face 65 is in contact with the turned-up edge 30.

The guidance of the first part 5 on the second part 35 when the exchanger is being brazed and the plates are being compacted is thereby enhanced. The quality of the brazing-together of the two parts and the sealing of the housing are also enhanced.

On the side of the second lateral wall 12 of the first part 5, the first flank 51 has a baffle 70 that forces the fluid that is to be cooled to circulate in the exchange zone 6. In other words, the first flank 51 has a baffle 70 situated on the surround 55 facing the fluid bypass zone 7. In this way, the opening 57 lies facing the heat exchange zone 6 and the baffle 70 lies facing the bypass zone 7 so that the fluid that is to be cooled and that enters the internal volume is guided into the exchange zone.

The baffle 70 has a pressing 72 facing towards the internal volume and ensuring contact between the baffle 70 and the plates 2 at the bypass zone 7.

In this instance, the first flank 51 and the second flank 52 are symmetric about a longitudinal median plane of the housing 10 such that they have the same features.

FIG. 3 illustrates the heat exchanger 1 provided with an inlet header tank 75 in contact with the first interface 53 and an outlet header tank 76 of a shape identical to the inlet header tank 75 and in contact with the second interface 54, as explained earlier.

The inlet and/or outlet header tank here has a coupling 77 that allows it to be connected to independent nozzles of the exchanger, the coupling 77 notably being situated in the middle of the tank. Such a tank 75, 76 has a wall 78 which defines a volume with the interface 53, 54 to which the tank is attached, the volume being open onto the opening of the said interface and allowing fluid to be collected from and/or distributed to the exchanger 1. An internal face of the wall 78 of this header tank is thus in contact with the collar and/or the surround 55 of the interface 53, 54 to which the tank is attached. The collar can thus penetrate inside the volume defined by the header tank. The baffles 70 in this instance are free and not covered by the header tanks 75, 76.

Figure 4:
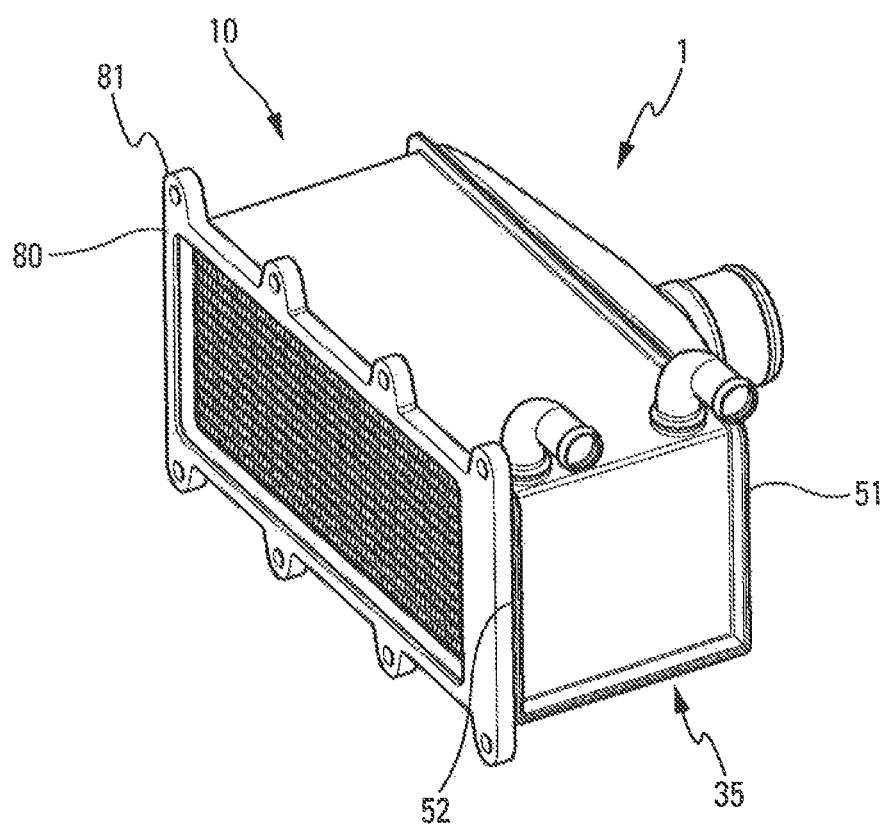
FIG. 4 is a view similar to FIG. 3 depicting an alternative form of embodiment.

FIG. 4 depicts an alternative form of embodiment in which on one of the two flanks 51, 52 of the second part 35 of the housing 10 is arranged a header tank in the form of an attachment flange 80 allowing the heat exchanger 1 to be connected up in the environment that accepts it, for example an engine cylinder head. The other flank 51, 52 here accepts an inlet and/or outlet header tank in the same way as explained before, but could equally accept a flange 80.

The flange 80 is therefore in contact with the interface defined by the flank on which it is situated. It is thus in contact with the surround and with any collar that this flank might have. The collar, in the same way as was explained before in the case of the inlet and/or outlet header tanks, penetrates an opening present in the middle of the flange 80 in register with the opening of the surround of the flank on which the flange 80 is situated. Lugs 81 project from the said surround and have holes able to accept a fastening that allows the heat exchanger to be fixed inside the vehicle.

Prior to the brazing operation, the plurality of stacked plates 2 is thus placed on the bottom 36 of the second part 35 and the top wall 13 of the first part 5 is placed on the plurality of stacked plates 2. The turned-up edge 30 is then in contact with the internal faces 65 of the first and second flanks 51, 52. When the operation of brazing the housing and the plurality of stacked plates is performed, a compaction phenomenon is then observed that reduces the height of the plurality of stacked plates 2, causing the first part 5 to move towards the bottom 36 of the second part 35 in the direction in which the plates are stacked. The first interface 53 and the second interface 54 do not change position during this brazing operation because they are situated on the second part 35 of the housing 10 which does not move during brazing.

The housing and/or the stack of plates are made, for example, of aluminium and/or aluminium alloy.

The invention claimed is:

1. A housing of a stacked-plate heat exchanger, said housing defining a volume for accepting a plurality of stacked plates that are configured for the circulation of a fluid that is to be cooled and of a coolant, said housing further defining an interface able to accept a header tank for the fluid that is to be cooled and comprising a first part configured to move in the direction in which the plates are stacked when the stacked plates are being brazed, and a second part that has at least one flank defining said interface, said first and second parts being able to be assembled with one another when the plates are being brazed, wherein said first part includes two lateral walls, a top wall, and a continuous turned-up edge along the entire first part of the housing such that the turned-up edge of the top wall joins together the turned-up edges of the two lateral walls which extend about lateral and distal ends thereof and only the first part of the housing moves when the plates are being brazed, and wherein a terminal end of the continuous turned-up edge faces away from the volume for accepting the plurality of stacked plates.

2. The housing according to claim 1, wherein said second part has two flanks defined as first and second flanks, wherein the first flank defines a first interface able to accept an inlet header tank for the fluid that is to be cooled and wherein the second flank defines a second interface able to accept an outlet header tank for the fluid that is to be cooled.

3. The housing according to claim 2, wherein said second part comprises a bottom intended to lie facing an end plate of the plurality of stacked plates, the bottom and the flanks forming a unit assembly.

4. The housing according to claim 1, wherein said interface defines a surround in the middle of which there is an opening allowing the fluid that is to be cooled to enter and/or leave said housing.

5. The housing according to claim 4, wherein the surround is bordered by a collar diverging towards the inside of said housing, delimiting the opening and able to collaborate with the header tank for the fluid that is to be cooled.

6. The housing according to claim 5, wherein a portion of the collar is in contact with a lateral end of the bottom of said second part.

7. The housing according to claim 1, wherein the lateral wall or walls and the top wall each have the continuous turned-up edge at least partially in contact with one face of the flank which face faces towards the inside of the volume and is further defined as an internal face.

8. The housing according claim 1, wherein the bottom of the second part comprises a central part and two longitudinal ends each defining a shoulder with respect to the central part, each shoulder allowing a distal end of the lateral walls of the first part to lie in a plane running externally to the volume defined by said housing.

9. A stacked-plate heat exchanger comprising a housing according to claim 1 and a plurality of stacked plates configured for the circulation of a fluid that is to be cooled and of a coolant, wherein the plurality of stacked plates is situated inside said housing.

10. The exchanger according to claim 9, in which each plate has a heat exchange zone to encourage the exchange of heat between the fluid that is to be cooled and the coolant, and a bypass zone able to allow the fluid that is to be cooled to bypass the heat exchange zone, part of said flank or flanks forming one or more baffles that force the fluid that is to be cooled to circulate through the exchange zone.

11. The housing according to claim 1, wherein the turned up edge extends in a plane perpendicular to the top wall.

12. The housing according to claim 1, wherein a concavity of the continuous turned up edge faces away from the volume for accepting the plurality of stacked plates.

13. The housing according to claim 11, wherein the continuous turned up edge extends in a direction away from the volume for accepting the plurality of stacked plates.

* * * * *